United States Patent
Praveen et al.

(10) Patent No.: US 10,546,154 B2
(45) Date of Patent: Jan. 28, 2020

(54) LAYERED MASKING OF CONTENT

(71) Applicant: Yodlee, Inc., Redwood City, CA (US)

(72) Inventors: Vunnava Praveen, Karnataka (IN); Syed Abid Hussain, Karnataka (IN)

(73) Assignee: Yodlee, Inc., Redwood City, CA (US)

( * ) Notice: Subject to any disclaimer, the term of this patent is extended or adjusted under 35 U.S.C. 154(b) by 110 days.

(21) Appl. No.: 15/796,652

(22) Filed: Oct. 27, 2017

(65) Prior Publication Data

US 2018/0285599 A1 Oct. 4, 2018

(30) Foreign Application Priority Data

Mar. 28, 2017 (IN) .............................. 201741010940

(51) Int. Cl.
*G06F 21/62* (2013.01)
*G06N 20/00* (2019.01)

(52) U.S. Cl.
CPC ...... *G06F 21/6254* (2013.01); *G06F 21/6263* (2013.01); *G06N 20/00* (2019.01)

(58) Field of Classification Search
CPC ............. G06F 21/6245; G06F 21/6263; G06F 21/6254; G06N 20/00
See application file for complete search history.

(56) References Cited

U.S. PATENT DOCUMENTS

| 9,848,005 | B2* | 12/2017 | Ardeli .................. H04L 63/101 |
| 10,200,364 | B1* | 2/2019 | Ketharaju ............ H04L 63/0861 |
| 2010/0318489 | A1 | 12/2010 | De Barros et al. |
| 2011/0040983 | A1 | 2/2011 | Grzymala-Busse et al. |
| 2011/0191274 | A1 | 8/2011 | Yu et al. |
| 2015/0193638 | A1 | 7/2015 | Cook |
| 2016/0162804 | A1* | 6/2016 | Agarwal ................ G06N 20/00 706/12 |
| 2016/0277439 | A1* | 9/2016 | Rotter ................. H04L 63/0861 |
| 2017/0048698 | A1 | 2/2017 | Choffnes et al. |
| 2017/0061419 | A1* | 3/2017 | Kim ..................... G06Q 20/102 |
| 2018/0005239 | A1* | 1/2018 | Schlesinger ....... G06Q 20/4014 |
| 2018/0219836 | A1* | 8/2018 | Peterson ................. H04L 63/04 |

OTHER PUBLICATIONS

International Application No. PCT/US2018/024181, Notification of Transmittal of the International Search Report and the Written Opinion of the International Searching Authority, dated Jul. 4, 2018, 11 pages.

* cited by examiner

*Primary Examiner* — Mohammad A Siddiqi

(74) *Attorney, Agent, or Firm* — Fish & Richardson P.C.

(57) ABSTRACT

Methods, systems and computer program products for layered masking of data are described. A system receives content including personally identifiable information (PII). The system redacts the content by masking the PII. The system identifies the PII in multi-layer processing, where in each layer, the system determines a respective confidence score indicating a probability that a token is PII. If the confidence score is sufficiently high, the system masks the token. Otherwise, the system provides the token to a next layer for processing. The layers can include regular expression based processing, lookup table based processing, and machine learning based processing.

20 Claims, 6 Drawing Sheets

LAYERED MASKING OF CONTENT

TECHNICAL FIELD

This disclosure relates generally to information security and data privacy

BACKGROUND

Certain information used inside certain organizations is not suitable for distribution outside of those organizations. For example, records containing sensitive content such as personally identifiable information (PII) typically need redaction before publication. The PII can include, for example, persons' names, addresses, social security numbers, birth dates, or account numbers. It is often mandatory for organizations to remove or mask any such information to protect privacy. In the redaction, a conventional system can mask the PII using various search and replace techniques. For example, the system can identify PII using pattern matching. The conventional techniques sometimes under-mask, letting PII pass through unmasked, or over-mask, masking non-PII information, reducing usability of the data.

SUMMARY

Layered content masking techniques are disclosed. A system receives content including PII. The system identifies and masks the PII in operations including multiple layers of processing. In a first layer, the system identifies suspected PII using regular expression matching. Each regular expression used in the matching is associated with a value indicating a likelihood that tokens matching the regular expression includes PII. The system determines a first confidence score of the suspected PII identified in regular expression matching based on the value. In a second layer, the system identifies suspected PII using a lookup table. The system determines a second confidence score of suspected PII identified by the lookup table. In a third layer, the system identifies suspected PII using models determined by machine learning. The system determines a third confidence score of the suspected PII identified using the models. The system then masks the suspected PII based on a weighted combination of the first confidence score, the second confidence score and the third confidence score. The system provides the masked content to a content consuming device for storage or presentation.

The features described in this specification can achieve one or more advantages. The disclosed techniques can reduce over masking, thus preserving usefulness of the data. At the same time, the disclosed techniques can reduce under masking, thus preventing PII from being exposed. Accordingly, the disclosed techniques improve upon conventional PII masking technology in terms of precision and thoroughness. The disclosed techniques have wide application among organizations such as schools, hospitals, pharmacies and online stores where privacy protection is important or in many cases, mandatory. In addition, although PII masking is provided as an example implementation of the disclosed techniques, the application of the techniques is not limited to PII or privacy data in general. The disclosed techniques can be applied to any information that requires redaction, including, for example, copyrighted material, certain public records (e.g., terms in a settlement of a dispute), or any internal information that an organization intends to prevent from being accessed by the general public. The disclosed techniques improve efficiency over conventional PII masking technology by reducing amount of work that is performed by a user when dealing with large data sets.

The details of one or more implementations of the disclosed subject matter are set forth in the accompanying drawings and the description below. Other features, aspects and advantages of the disclosed subject matter will become apparent from the description, the drawings and the claims.

BRIEF DESCRIPTION OF THE DRAWINGS

Like reference symbols in the various drawings indicate like elements.

DETAILED DESCRIPTION

Figure 1:
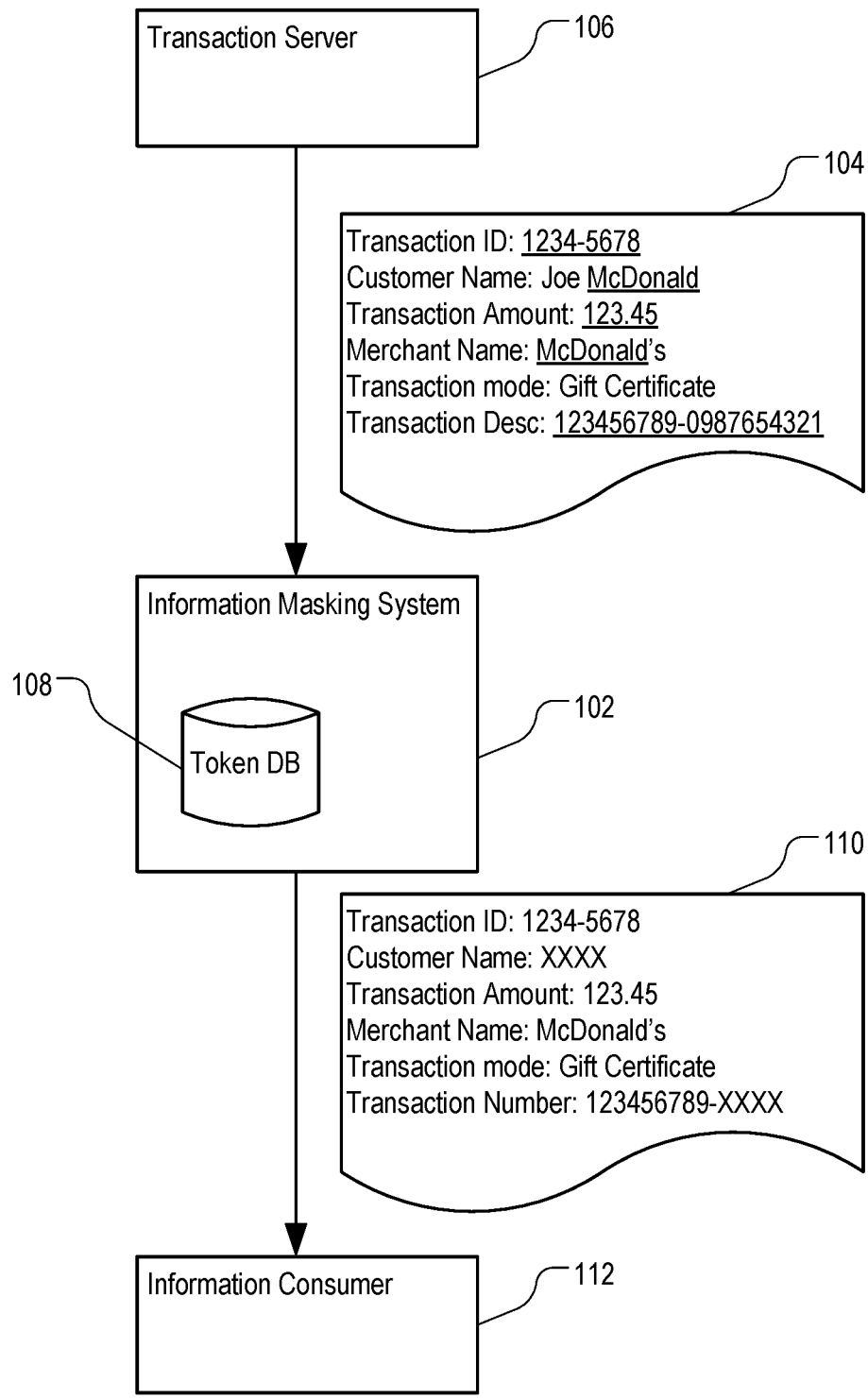
FIG. 1 is a block diagram illustrating example techniques of layered masking of content.

FIG. 1 is a block diagram illustrating example techniques of layered masking of content. The operations and procedures described in reference to FIG. 1 are performed by an information masking system 102. The information masking system 102 can include one or more computers each having one or more hardware computer processors.

The information masking system 102 receives transaction data 104 from a transaction server 106. The transaction data 104 includes one or more records of transactions. A transaction can be an instance of interaction between a first user and a second user (e.g., between two humans), a user and a computer, or a first computer and a second computer, that has been recorded by the transaction server 106.

The transaction server 106 includes one or more storage devices storing the transactional data 104. Examples of a transaction server 106 include a log server, an action data store, or a general ledger managing computer of various agencies. The agencies can include, for example, an interactive content provider, e.g., a news provider that allows readers to posts comments; an on-line shop that allows users to buy goods or services, e.g., prescription medicine or pet food, a healthcare network that serves new and existing patients, or a financial services provider, e.g., a bank or credit card company that tracks financial transactions.

Each record in the transaction data 104 can have multiple data fields. The data fields of a record can include, for example, an identifier field storing a transaction identifier identifying the transaction represented by the record (e.g., "1234-5678"). The data fields can include a name field storing a customer name (e.g., "Joe McDonald"). The data fields can include a value field storing a transaction value (e.g., "123.45") that represents a magnitude of the transaction. The magnitude can be, for example, a size of a file downloaded in the transaction, a number of units of goods or services purchased, an amount paid, or an amount deposited or withdrawn from an account. The data fields can include a magnitude unit field indicating what aspect, e.g., megabytes, dollar amount, etc., that the magnitude measures. The data fields can include a provider field storing a service provider name (e.g., a restaurant named "McDonald's"). The data fields can include a mode field storing a transaction mode (e.g., "gift certificate," "check," or "credit card"). The data fields can include a description field storing a transaction description. The transaction description can be free-form text string, and may include, for example a name of an item purchased, or in this example shown, one or more numbers (e.g., "123456789-0987654321"). The information masking system 102 can recognize tokens from each data field. Each token can be a unit of information as recognized by the information masking system 102. A token can be a word, a number, or a series or combination of words or numbers. In the example shown, based on various techniques used, e.g., regular expression match or exact match, the information masking system 102 can recognize the string "1234-5678" as a single token in certain portion of the processing, or as two distinct tokens "1234" and "5678" in another portion of the processing.

The information masking system 102 is configured to identify and mask PII from the transaction data 104 while changing the transaction data 104 minimally to preserve integrity and usefulness of the transaction data 104. For example, the information masking system 102 is programmed to recognize that content of a first field (e.g., "Joe McDonald") is PII representing a person's name, which is to be masked. The information masking system 102 can determine that similar content of a second field (e.g., a store name "McDonald's") is not PII and should be protected from masking. Likewise, the information masking system 102 is programmed to recognize that a portion (e.g., "0987654321") of a description field is PII representing a gift certificate number, whereas another portion (e.g., "123456789") is a store number and therefore not PII.

The information masking system 102 distinguishes PII and non-PII content by performing a layered analysis that, compared to conventional masking techniques, increases the accuracy of masking and reduces over-masking. In a first layer, the information masking system 102 masks numbers in the transaction data 104 using regular expressions.

The information masking system 102 can determine, from historical transaction data, patterns that are likely to belong to PII category. The information masking system 102 then converts the patterns in to regular expressions. The information masking system 102 can mask certain PII, e.g., user account numbers, gift certificate numbers, payment card numbers in this layer by replacing content matching the regular expressions with other text (e.g., "XXXX"). The results of the regular expression based masking can include partially masked content and confidence scores of content that are suspected to be PII but may be non-PII and thus not masked at this stage. Additional details of the regular expression based masking are described below in reference to FIG. 2.

The information masking system 102 improves results of the regular expression based masking by applying second layer processing. The second layer processing includes lookup table based masking. The lookup table based masking involves examining tokens in the transaction data 104 using a lookup table. The information masking system 102 can populate the lookup table with one or more front end computers designated as agents or gatherers. The front end computers are configured to fetch historical transaction data from one or more transaction servers 106 and populate a token database 108. The token database 108 can include a table storing tokens that historically indicate PII. For example, a token can include an account holder name, e.g., the word "McDonald." The token database 108 can store this token in the table, and designate this table as a lookup table. The token can be hashed in the lookup table. The front end computers can scrape one or more tokens, e.g., the account holder's name, from the transaction server 106, or from an external site. The information masking system 102 can perform a lookup in the token database 108 for tokens in the transaction data 104 and determine whether a particular token may contain PII, and masks those tokens.

The scraping that populated the token database 108 may not be absolutely accurate. For example, tokens such as the words "savings," "deposit" or "withdrawal" may be entered as account holder names in the token database 108 due to input error. The token database 108 may not store an exhaustive list of tokens that indicate PII. The token database 108 may not store variations of names, for example, "Tom" for "Thomas" or "Bill" for "William." Thus, the results of the lookup table based masking of the second layer processing may not be completely accurate and complete. The results of the lookup table based masking can include partially masked content and confidence scores of content that are suspected to be PII but may be non-PII and thus not masked at this stage. The confidence scores in the lookup table based masking may be different from the confidence scores generated in the regular expression based masking.

The information masking system 102 improves results of the lookup table based masking of the second layer with third layer processing. The third layer processing include machine learning based masking. The information masking system 102 can use various pattern recognition and machine learning algorithms in the machine learning based masking, including, for example, conditional random fields (CRFs). Results of the machine learning based masking can include partially masked content and confidence scores of suspected PII. Additional details on the third layer processing are described below in reference to FIGS. 2-3.

The information masking system 102 generates redacted transaction data 110. In the redacted transaction data 110, PII including, for example, customer names, gift certificate numbers, account numbers and other sensitive information are masked in the three layers, or masked based on the confidence scores produced by the three layers. The information masking system 102 can provide the redacted transaction data 110 to one or more information consuming devices 112 for consumption. An information consuming devices 112 can include one or more computers configured to analyze the redacted transaction data 110 for various purposes, e.g., for determining content download pattern, predicting usage demand, forecast network traffic, among others.

For convenience, the techniques disclosed in reference to FIG. 1 and subsequent figures are described in terms of PII. In various implementations, the information masking system 102 can identify and mask other type of transaction data. Such transaction data can include, for example, system logs where certain server access is to be redacted, or plain text from which illegal content is to be filtered out.

Figure 2:
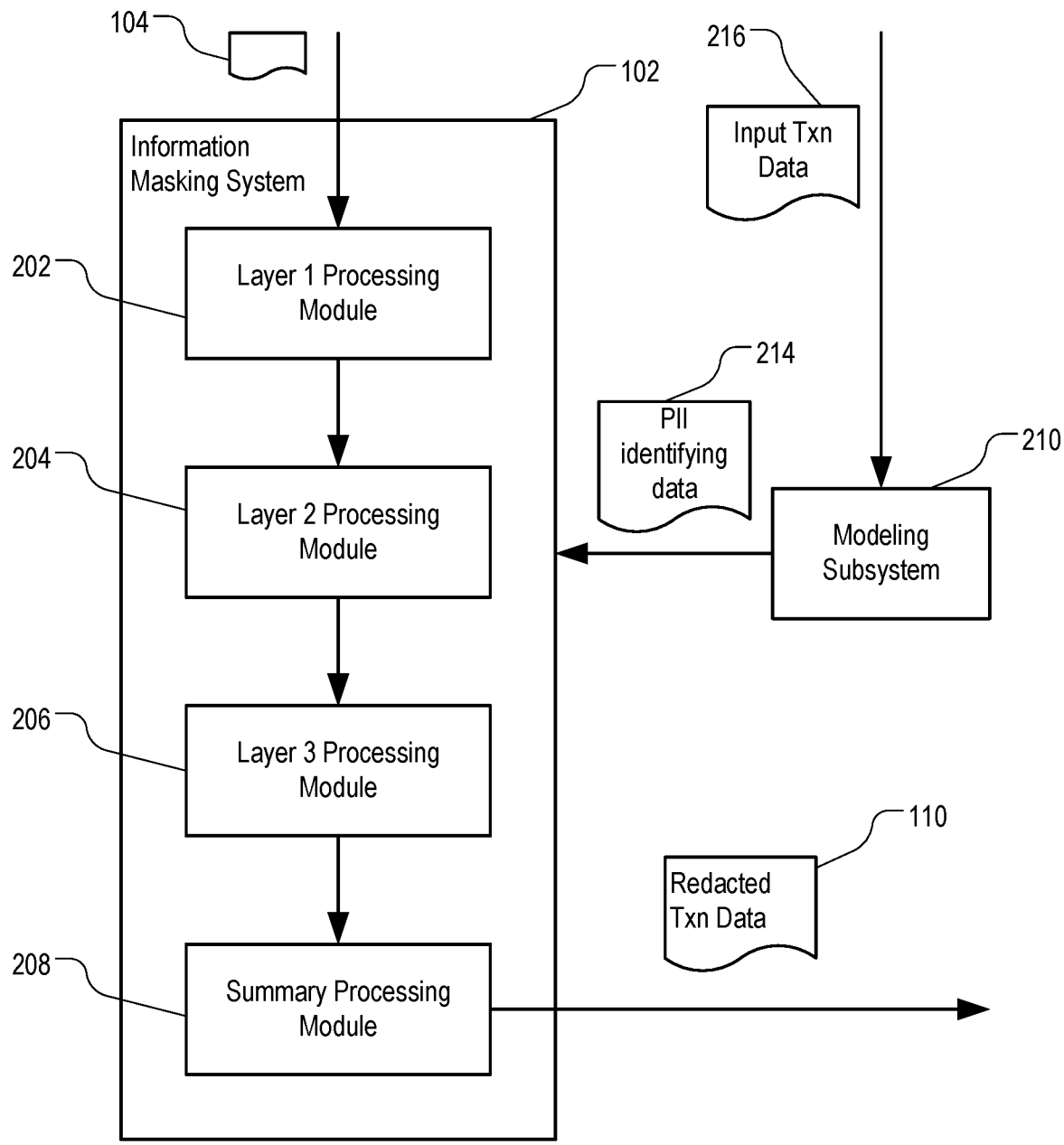
FIG. 2 is a block diagram illustrating example layers in layered masking of content.

FIG. 2 is a block diagram illustrating example layers in layered masking of content. An information masking system 102 can include multiple modules corresponding to the layers of the layered masking. Each module can include one or more hardware computer processors programmed to perform corresponding functions.

The information masking system 102 includes a first layer processing module 202. The first layer processing module 202 is configured to perform regular expression based masking and generate one or more confidence scores for one or more transactions.

For example, the first layer processing module 202 receives transaction data 104. The transaction data 104 includes a first record of a first transaction. In this example, the first record includes a transaction description that reads "Purchased at Walmart 1234-5678-9012-3456." The first layer processing module 202 can determine that a token including the sequence "1234-5678-9012-3456" matches, e.g., resolves to, a regular expression as shown in Listing 1.

$$(^1[0-9]\{3\})-([0-9]\{4\})-(90[0-9]\{2\})-([0-9]\{4\}) \quad (1)$$

The example regular expression in Listing (1) above is stored in a regular expression database. The regular expression in the database is an indication that tokens matching the regular expression may include PII. The first layer processing module 202 can determine a confidence score for the matching token, the confidence score can indicate a likelihood that the matching token is indeed PII.

The regular expression can be pre-generated by the first layer processing module 202 or by another system. In some implementations, the first layer processing module 202 generates the regular expression and the confidence score. The first layer processing module 202 can generate the regular expression and the confidence score from historical transaction data and training data. For example, the first layer processing module 202 can receive transaction descriptions in historical transaction data, e.g., "Purchased at Walmart Amanda Seller" and "Purchased at Walmart Joe McDonald." The first layer processing module 202 can receive training data that corresponds to the historical transaction data. More specifically, the training data includes transaction records where known PII has been masked. For example, the training data corresponding to the historical transaction data above can include the following redacted descriptions: "Purchased at Walmart XXXX" and "Purchased at Walmart XXXX." The first layer processing module 202 replaces the mask, here the sequences of "XXXX," with a single token (e.g., "XSequence spaces") to form strings "Purchase at Walmart XSequence spaces" and "Purchase at Walmart XSequence spaces."

The first layer processing module 202 then performs clustering on the historical transaction data, which are reduced. The clustering includes unsupervised learning where transactions that are estimated to be similar to one another are grouped together. The first layer processing module 202 converts clusters whose cardinalities satisfy a threshold into regular expressions. In the example shown, the first layer processing module 202 generates a cluster of identical strings (e.g., "Purchase at Walmart XSequence spaces") having a cardinality of two (2), which satisfies a pre-determined threshold (e.g., two). Accordingly, the first layer processing module 202 generates a regular expression (e.g., "Purchased at Walmart.*") to represent the cluster. The first layer processing module 202 then stores the regular expression in the regular expression database.

The first layer processing module 202 can determine that some clusters are ambiguous. For example, historical transaction data can include two records "USAA ATM withdrawal Amanda seller" and "USAA ATM withdrawal 5456387." The training data can include "USAA ATM withdrawal XXXX" and "USAA ATM withdrawal 5456387" where the term "Amanda seller" is identified as PII and masked. The number "5456387" is not masked in the training data because the number is not PII. For example, the number can be a branch code for a branch office of a bank "USAA" which does not represent an individual.

The first layer processing module 202 can determine that, for example, a cluster of "USAA ATM withdrawal" contains X (e.g., 10000) records of transactions, where among the X records, Y (e.g., 9000) records include "USAA ATM withdrawal XXXX" whereas Z (e.g., 1000) records include "USAA ATM withdrawal" followed by various numbers. The first layer processing module 202 can generate a regular expression corresponding to "USAA ATM withdrawal" and associate a confidence score of Y/X, in this example, 9000/10000=0.9, to the regular expression, indicating that there is a 90 percent likelihood that a token that follows "USAA ATM withdrawal" is PII. The first layer processing module 202 can store this confidence score in association with the regular expression "USAA ATM withdrawal.*" in the regular expression database.

At masking time, the first layer processing module 202 applies this previously generated regular expression to the description (e.g., "Purchased at Walmart 1234-5678-9012-3456") in the transaction data 104. In this example, the first layer processing module 202 determines that a confidence score associated with the matching regular expression is 1.0, which is higher than a threshold (e.g., 0.99). In response, the first layer processing module 202 can mask the token "1234-5678-9012-3456" as PII. If the first layer processing module 202 determines that a confidence score (e.g., 0.9) associated with the matching regular expression does not satisfy the threshold, the first layer processing module 202 keeps the token without masking, and associates the confidence score (0.9) with the token, and passes the record to the next layer.

The first layer processing module 202 thus provides an output to a second layer processing module 204 for further processing. The second layer processing module 204 is configured to perform lookup table based masking and generate one or more confidence scores for suspected PII in one or more transactions. In the lookup table based masking, the second layer processing module 204 searches each token in a record in a lookup table storing known PII, e.g., historical data that has been confirmed to be PII. The second layer processing module designates tokens found in the lookup table as PII. The search is based on a match that is different from a regular expression match. The regular expression is an abstraction where, for example, [0-9] resolves to a number 0 through 9 and [a-zA-Z] resolves to any alphabet a through z or A through Z. A lookup table match is an exact match, e.g., where "0-9" maps to a string having three consecutive characters "0" followed by "-" followed by "9." In various implementations, an exact match can be a strict match where cases of characters are matched, or a loose match where cases are ignored.

The second layer processing module 204 can create and populate the lookup table before masking time. In some implementations, the second layer processing module 204 can create and populate a positive lookup table and a negative lookup table. The positive lookup table can include tokens of known PII, which the second layer processing module 204 will mask. The second layer processing module 204 can populate the positive lookup table with known PII words or phrases, e.g., names of account holders such as "Joe McDonald." Once the second layer processing module 204 identifies one or more tokens from the transaction data that match one or more tokens in the positive lookup table, the second layer processing module 204 can mask those one or more tokens.

The negative lookup table can include tokens that the second layer processing module 204 will avoid masking. These tokens are treated as stop words to prevent over-masking. The second layer processing module 204 can populate the negative lookup table with known words or phrases that, although similar to PII, are known not to be PII, e.g., names of stores such as "McDonald's" or "Macy's." If, at masking time, the second layer processing module 204 finds a match for a token in the negative lookup table, the second layer processing module 204 can mark this token, e.g., by assigning a confidence score of −1 to the token, and prevents this token from being masked.

The second layer processing module 204 can populate the positive lookup table and negative lookup table with training data and past transaction data. The second layer processing module 204 can associate a respective confidence score with each token in each lookup table, and assign the confidence score to a matching token in a record of the transaction data 104.

For example, the second layer processing module 204 receives the following descriptions in two historical transaction records: "Bank of America Atm withdrawal Thomas Patrick," "Travel booking Thomas Cook." Both of the transactions originated from a person named Thomas Patrick, whereas the second transaction is performed with a travel agency by the name of "Thomas Cook." Accordingly, masking the word "Thomas" will be correct in the first case, but erroneous in the second case. To alleviate this problem, the second layer processing module 204 can identify the words, which are name tokens, that have historically been used in both non-PII context, e.g., which were used in the context of an organization, a store name, and in PII context, e.g., as a name of a person. The second layer processing module 204 can assign a confidence score to tokens that are used in both PII context and non-PII context based on a proportion of historical transaction data which contained the token, e.g., "Thomas," as PII versus the token as non-PII. The training data can indicate whether a token in a context is PII or is not PII.

For tokens that has never been used in a non-PII context, e.g., never been used as an organization or store name, the second layer processing module 204 can associate a confidence score of one (1.0), and mask such tokens. The second layer processing module 204 can provide output of lookup table for use at masking time. The second layer processing module 204 can provide results based masking and associated confidence scores to a third layer processing module 206 for further processing.

The third layer processing module 206 is configured to perform machine-learning based masking and generate one or more confidence scores for one or more transactions represented in the transaction data 104. The third layer processing module 206 can use algorithms include, for example, CRFs to identify suspected PII. The techniques can be referred to as named entity recognition. The third layer processing module 206 can use CRFs and other undirected graphical models to model the conditional probability of a token given the existence of other tokens in a transaction description. In particular, the conditional random fields model the conditional probability of a word being PII given the other words in the transaction description and their labels. The third layer processing module 206 can perform the machine learning based masking based on models derived from training data.

The third layer processing module 206 can generate the training data from historical transaction data. The third layer processing module 206 can obtain the training data by extracting data fields, e.g., descriptions, from the historical transaction data, and receive truth input labeling tokens in the labels as PII or non-PII. The third layer processing module 206 can then identify tokens that include suspected PII in the transaction data 104 based on the training data, and provide a confidence score for the suspected PII. Upon determining that the confidence score is above a threshold, the third layer processing module 206 can mask the suspected PII. Otherwise, the third layer processing module 206 can provide the suspected PII in association with the confidence score for further processing.

As described above, each of the first layer processing module 202, second layer processing module 204 and third layer processing module 206 determines a respective confidence score for suspect PII. These modules 202, 204 and 206 can mask the suspected PII upon determining that the respective confidence score satisfies a respective threshold. For the suspected PII the confidence scores of which does not satisfy the thresholds, a summary processing module 208 can perform additional determination on whether to mask the suspected PII based on the confidence scores.

The summary processing module 208 is a component of the information masking system 102 configured to mask potential PII based on confidence scores generated by other modules of the information masking system 102. The summary processing module 208 can determine a summary confidence score of a token being PII using a weighted sum of the respective confidence scores, for example, by using Equation (2) below.

$$SCS=\Sigma \lambda_i X_i, \qquad (2)$$

where SCS is the summary confidence score of a token being PII, $X_i$ is a confidence score calculated at layer i, and $\lambda_i$ is a weight of the confidence score at layer i, where layer i includes the first layer, second layer and third layer as described above.

The summary processing module 208 can then mask a token including suspected PII if the summary confidence score for that token satisfies, e.g., is greater than, a summary threshold. The summary processing module 208 then generate redacted transaction data 110 for other computer systems for consumption.

The various modules of the information masking system 102 can mask suspected PII using various paradigms. For example, the information masking system 102 can mask suspected PII using micro batching, where the information masking system 102 masks identified PII in multiple small sets (e.g., thousands of records per set) of transactions in the transaction data 104. The information masking system 102 can mask suspected PII in batch mode, where the information masking system 102 masks suspected PII in large batch (e.g., millions of records per batch) across a cluster of computers that masks the suspected PII in parallel. The information masking system 102 can mask suspected PII in real time mode, where the masking is applied to each incoming transaction at time the incoming transaction is recorded in a transaction database.

In the examples provided above, each of the modules 202, 204 and 208 generates regular expressions, lookup tables, and machine learning models, respective, from historical transaction data. These generated data sets are generally referred to as PII identifying data. In some implementations, a modeling subsystem 210 can generate PII identifying data 214 from input transaction data 216, and provide the PII identifying data 214 to respective modules. The modeling subsystem 210 can be a component of the information masking system 102, or a separate system. The modeling subsystem 210 can include one or more processors. The PII identifying data 214 can include various information used by the modules of the information masking system 102.

The modeling subsystem 210 receives the input transaction data 216. The input transaction data 216 can include historical transaction data, simulated transaction data, or both. The input transaction data 216 can include transaction descriptions. The input transaction data 216 can include training data, e.g., truth data on whether a token is PII in a given context.

The modeling subsystem 210 generates regular expressions representing PII and confidence scores associated with the regular expressions from the input transaction data 216. The modeling subsystem 210 provides the regular expressions and corresponding confidence scores to the first layer processing module 202 as part of the PII identifying data 214.

The modeling subsystem 210 generates one or more positive lookup tables and one or more negative lookup tables from the input transaction data 216. The modeling subsystem 210 provides the lookup tables and corresponding confidence scores to the second layer processing module 204 as part of the PII identifying data 214.

The modeling subsystem 210 generates one or more scoring models, and provide the one or more scoring models to the third layer processing module 206 as part of the PII identifying data 214. The modeling subsystem 210 can receive input of truth data that indicates which tokens in the input transaction data 216 are PII. The modeling subsystem 210 then passes the transaction description including the truth data as input to a normalization module and a feature extraction module. The normalization module can normalize the tokens. The feature extraction module can extract features from the normalized tokens. The extracted features can include a token or an n-gram from a transaction description. The feature extraction module labels PII as noun forms while labeling other tokens or n-grams as non-noun forms. The feature extraction module then computes a probability of a noun feature following a sequence of noun/non-noun features for the training data. The modeling subsystem 210 can perform CRF learning, including learning various conditional probabilities, e.g., probability of a word W being PII given the identity and PII-binary-label of previous N words in the normalized description. The modeling subsystem 210 can generate one or more scoring models based on the probabilities. Additional details on the operations of generating the one or more scoring models are described below in reference to FIG. 3.

Figure 3:
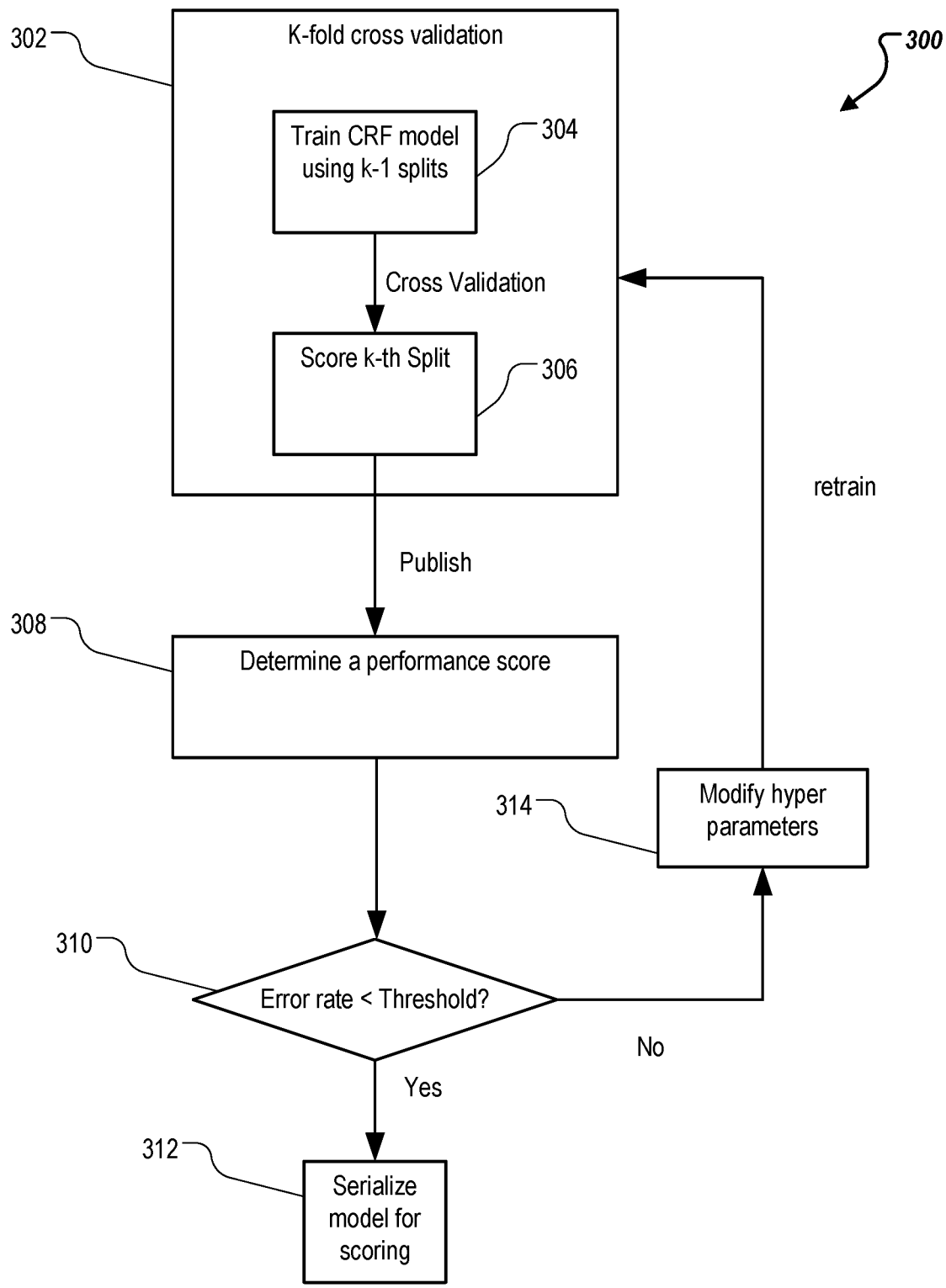
FIG. 3 is a flowchart illustrating an example process of generating one or more scoring models for layered masking.

FIG. 3 is a flowchart illustrating an example process 300 of generating one or more scoring models for layered masking. The operations of FIG. 3 can be performed by a system including one or more processors, e.g., the third layer processing module 206 or the modeling subsystem 210 of FIG. 2. The operations can include a leave-out K cross-validation where training data is split into K subsets.

The system can perform a k-fold cross validation 302 on training data in one or more iterations. Each iteration can include training (304) CRF model using K-1 subsets to validate a K-th subset. The system computes (306) a score of the K-th subset from the validation. The validation helps in optimizing hyper parameters of the model resulting in less over fit of the model. The system then uses learnt CRF on the training data to estimate a PII label for each token. The PII label can indicate whether the corresponding token contains PII. The system calculates (308) a performance score of the estimated PII label by comparing the estimation with truth data. The performance score can indicate an error rate. The error rate can be, for example, a ratio of errors versus the total. An error can be a situation where the system mislabels PII as non-PII or mislabels non-PII as PII.

The system can determine (310) whether the error rate satisfies a threshold value. Upon determining that the error rate satisfies the threshold value, the system can serialize (312) the model for scoring. Serializing the model can include storing the model in a database and providing the model, as part of the PII identifying data 214 (of FIG. 2), to a third layer processing module.

Upon determining that the error rate does not satisfy the threshold value, for example by being too high, the system can modify (314) hyper parameters of the training. The hyper parameters can include, for example, number of clusters used, learning rate, etc. The system then retrains, until a model is determined.

Figure 4:
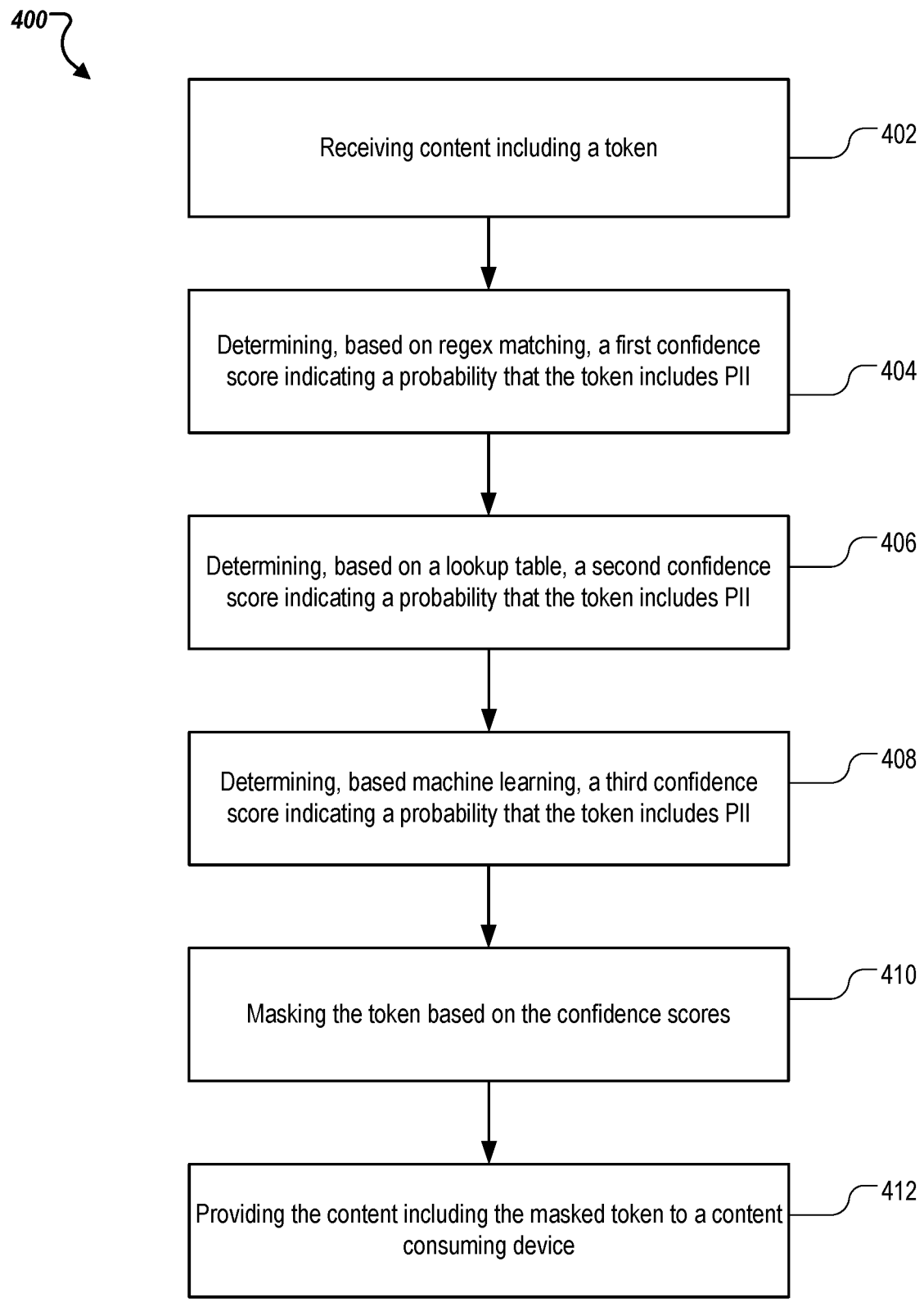
FIG. 4 is a flowchart of an example process of layered masking of content.

FIG. 4 is a flowchart of an example process 400 of layered content masking. The process 400 can be performed by a system including one or more processors, e.g., the information masking system 102 of FIG. 1.

The system receives (402) content including a token. The content can include transaction data. The transaction data can include one or more transaction records each corresponding to a respective transaction and each including a description of the transaction. The token can be a part of the description and includes at least one of a number or a word. The token can include a series of numbers or words separated by a delimiter, e.g., "1234-5678" or "(800) 555-1234."

The system determines (404), based on regular expression matching, a first confidence score indicating a probability that the token includes PII. The first confidence score is associated with the regular expression that matches the token. The regular expression can be derived from historical transaction data. The first confidence score can be derived from a ratio between a number of terms in the historical transaction data that match the regular expression and that are PII and a total number of terms in the historical transaction data that match the regular expression, whether or not including PII.

The system determines (406), based on a lookup table, a second confidence score indicating a probability that the token includes PII. The second confidence score is associated with a term in the lookup table that matches the token. The match is an exact match, which is different from a regular expression match. The lookup table can be derived from historical transaction data. The second confidence score can be derived from a ratio between a number of appearances of the token in the historical transaction data as PII and a total number of appearances of the token in the historical transaction data.

The system determines (408), based on a model generated from machine learning, a third confidence score indicating a probability that the token includes PII. The machine learning can be based on a CRF algorithm. The system can provide training data for the CRF algorithm. The training data includes first data marked as PII and second data marked as non-PII. The first data is labeled as noun forms for the CRF algorithm. The second data is labeled as non-noun forms.

The system masks (410) the token based on the first confidence score, the second confidence score and the third confidence score. Masking the token can include replacing the token with a pre-specified string, or a generated string having a same length as the token.

In some implementations, masking the token based on the first confidence score, the second confidence score and the third confidence score can include the following operations. The system determines that at least one of the first confidence score, the second confidence score or the third confidence score satisfies a respective confidence threshold. In response, the system masks the token. The confidence thresholds for different layers can have different values. The first confidence score can be compared with a threshold T1;

the second confidence score can be compared with a threshold T2; and the third confidence score can be compared with a threshold T3, independently. The summary confidence score can be compared with a different threshold T4.

In some implementations, masking the token based on the first confidence score, the second confidence score and the third confidence score can include the following operations. The system determines that none of the first confidence score, the second confidence score or the third confidence score satisfies a respective confidence threshold. The system determines whether a weighted combination of the first confidence score, the second confidence score and the third confidence score satisfies a combined confidence threshold. The system can determine the weighted combination using Equation (2) described above. The system masks the token upon determining that the weighted combination satisfies the combined confidence threshold.

In some implementations, the system masks the content in a micro batching mode, where the system divides the content into multiple sets of strings, each set having a size limit. The system performs the masking on each set. In some implementations, the system performs the masking operations in a batch mode or a real time mode.

The system provides (412), as data of improved privacy, the content including the masked token to a content consuming device. The content consuming device can store the content on a storage device, or present the content on an output device, e.g., a display device or a printing device. The masked token can be a token previously including PII transformed into a string not including PII.

Figure 5:
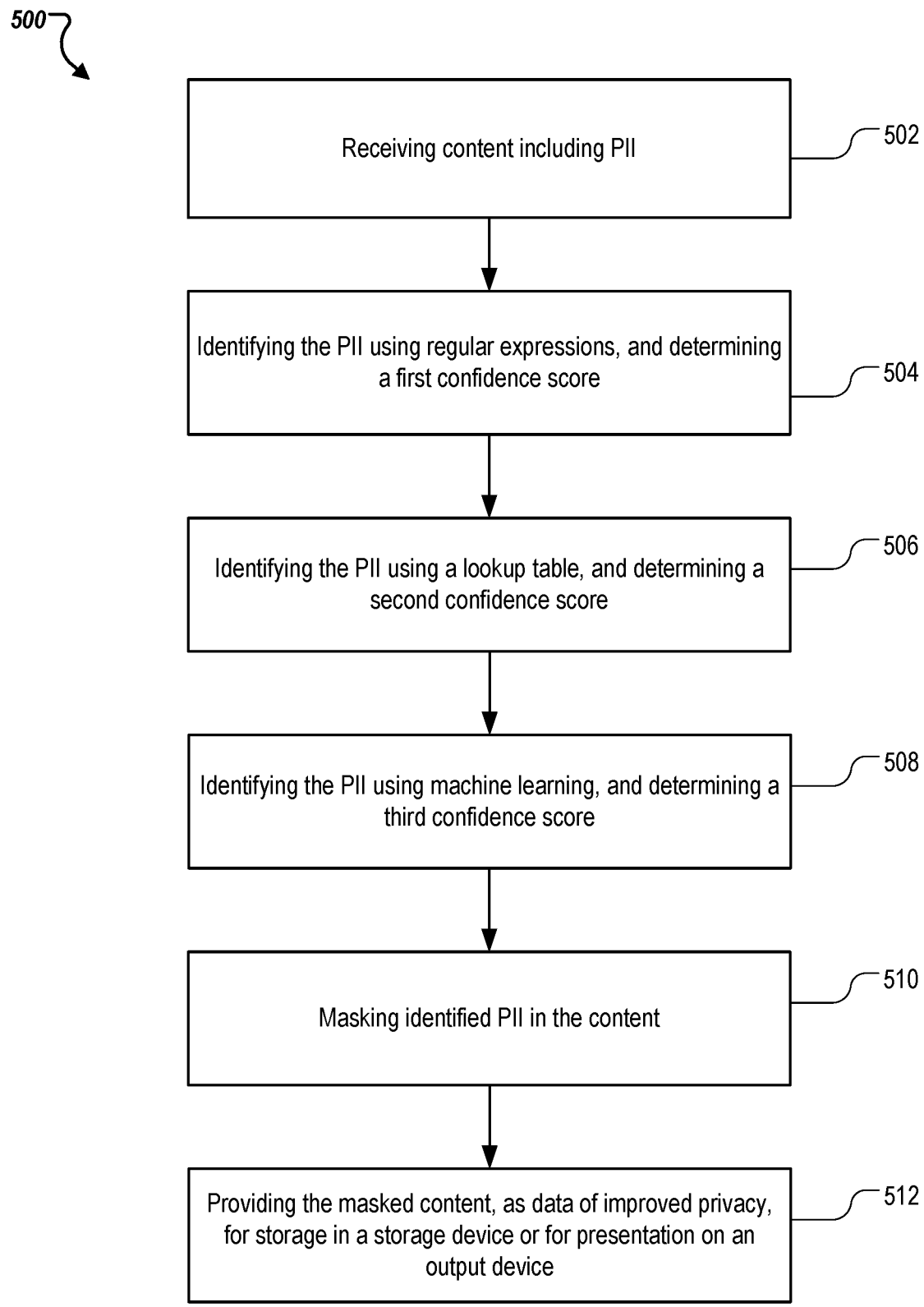
FIG. 5 is a flowchart of an example process of layered masking of content.

FIG. 5 is a flowchart of an example process 500 of layered masking. The process 500 can be performed by a system including one or more processors, e.g., the information masking system 102 of FIG. 1.

The system receives (502) content including PII. In first layer processing, the system identifies (504) suspected PII from the content using regular expressions, and determines a first confidence score of a first result identified in the first layer processing. In second layer processing, the system identifies (506) suspected PII using a lookup table, and determines a second confidence score of a second result identified in the second layer processing. In third layer processing, the system identifies (508) suspected PII using a machine learning algorithm, and determines a third confidence score of a third result identified in the third layer processing. The system then masks (510) the suspected PII identified from the content based on a weighted combination of the first confidence score, the second confidence score and the third confidence score. The system provides (512) the masked content to a content consuming device for storage on a storage device or presentation on an output device.

Exemplary System Architecture

Figure 6:
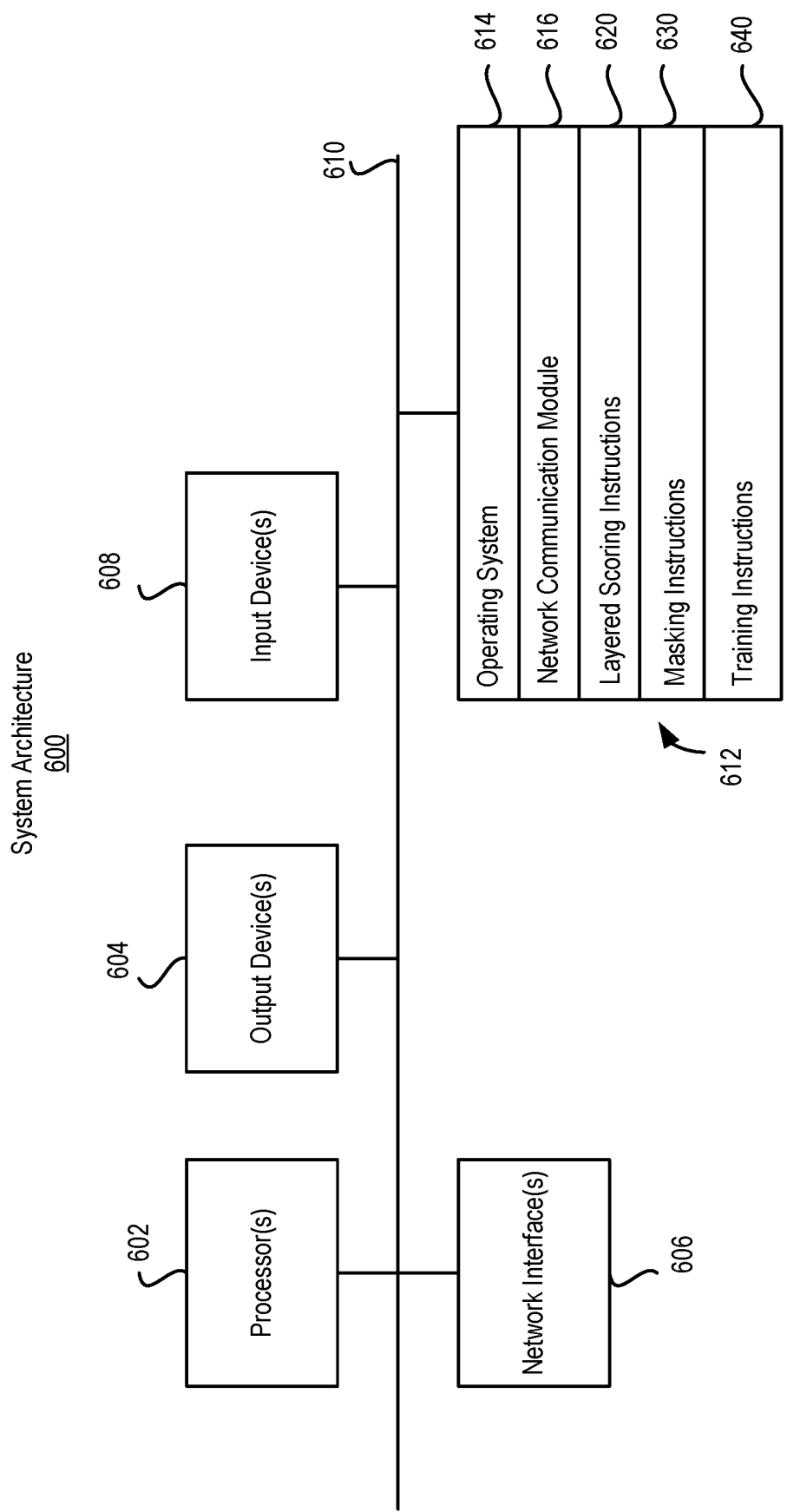
FIG. 6 is a block diagram illustrating an example architecture for implementing the features and operations described in reference to FIGS. 1-5.

FIG. 6 is a block diagram of an example system architecture for implementing the systems and processes of FIGS. 1-5. Other architectures are possible, including architectures with more or fewer components. In some implementations, architecture 600 includes one or more processors 602 (e.g., dual-core Intel® Xeon® Processors), one or more output devices 604 (e.g., LCD), one or more network interfaces 606, one or more input devices 608 (e.g., mouse, keyboard, touch-sensitive display) and one or more computer-readable mediums 612 (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "computer-readable medium" refers to a medium that participates in providing instructions to processor 602 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 612 can further include operating system 614 (e.g., a Linux® operating system), network communication module 616, layered scoring instructions 620, masking instructions 630 and training instructions 640. Operating system 614 can be multi-user, multiprocessing, multitasking, multithreading, real time, etc. Operating system 614 performs basic tasks, including but not limited to: recognizing input from and providing output to devices 606, 608; keeping track and managing files and directories on computer-readable mediums 612 (e.g., memory or a storage device); controlling peripheral devices; and managing traffic on the one or more communication channels 610. Network communications module 616 includes various components for establishing and maintaining network connections (e.g., software for implementing communication protocols, such as TCP/IP, HTTP, etc.).

Layered scoring instructions 620 can include computer instructions that, when executed, cause processor 602 to perform functions of identifying PII in transaction data and computing confidence scores for the transaction data in multiple layers of processing. Masking instructions 630 can include computer instructions that, when executed, cause processor 602 to perform mask identified PII. Training instructions 640 can include computer instructions that, when executed, cause processor 602 to determine confidence scores for regular expressions and tokens, and to determine machine learning models.

Architecture 600 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:
   receiving content including a token;
   storing one or more regular expressions for the content, wherein each regular expression comprises a sequence of symbols and characters expressing a string or pattern;
   determining, by a computer system based on matching the one or more regular expressions with the token, a first confidence score indicating a probability that the token includes personally identifiable information (PII), the first confidence score being associated with the regular expression;
   storing a lookup table that includes one or more tokens for known PII;
   determining, by the computer system based on matching the token with tokens in the lookup table, a second confidence score indicating a probability that the token includes PII, the second confidence score being associated with a term in the lookup table that is an exact match of the token;
   storing a model for determining a third confidence score indicating a probability that the token includes PII, wherein the model is generated using a machine learning training algorithm;
   determining, by the computer system based on inputting the token into the model, the third confidence score;
   masking the token by the computer system based on the first confidence score, the second confidence score and the third confidence score; and
   providing, by the computer system as data of improved privacy, the content including the masked token to a content consuming device.

2. The method of claim 1, wherein:
   the content includes transaction data, the transaction data including one or more transaction records each corresponding to a respective transaction and each including a description of the transaction, and the token is a part of the description and includes at least one of a number or a word.

3. The method of claim 1, wherein the one or more regular expressions are derived from historical transaction data, the first confidence score is derived from a ratio between a number of terms in the historical transaction data that match the regular expression and that are PII and a total number of terms in the historical transaction data that match the regular expression.

4. The method of claim 1, wherein the lookup table is derived from historical transaction data, the second confidence score is derived from a ratio between a number of appearances of the token in the historical transaction data as PII and a total number of appearances of the token in the historical transaction data.

5. The method of claim 1, wherein the model is based on a conditional random field (CRF) algorithm.

6. The method of claim 5, comprising providing training data for the CRF algorithm, the training data including first data marked as PII and second data marked as non-PII, wherein the first data is labeled as noun forms for the CRF algorithm, the second data is labeled as non-noun forms.

7. The method of claim 1, wherein masking the token based on the first confidence score, the second confidence score and the third confidence score comprises:
  determining that at least one of the first confidence score, the second confidence score or the third confidence score satisfies a respective confidence threshold; and
  in response to the determining, masking the token.

8. The method of claim 1, wherein masking the token based on the first confidence score, the second confidence score and the third confidence score comprises:
  determining that none of the first confidence score, the second confidence score or the third confidence score satisfies a respective confidence threshold;
  determining whether a weighted combination of the first confidence score, the second confidence score and the third confidence score satisfies a combined confidence threshold; and
  masking the token upon determining that the weighted combination satisfies the combined confidence threshold.

9. The method of claim 1, wherein the masking the content is performed in a micro batching mode, wherein the content is divided into a plurality of sets of strings, each set having a size limit, and the masking is performed on each set.

10. The method of claim 1, wherein the masking the content is performed in a batch mode or a real time mode.

11. A system comprising:
  one or more processors; and
  a non-transitory computer-readable medium storing instructions that, when executed by the one or more processors, cause the one or more processors to perform operations comprising:
    receiving content including a token;
    storing one or more regular expressions for the content, wherein each regular expression comprises a sequence of symbols and characters expressing a string or pattern;
    determining, based on matching the one or more regular expressions with the token, a first confidence score indicating a probability that the token includes personally identifiable information (PII), the first confidence score being associated with the regular expression;
    storing a lookup table that includes one or more tokens for known PII;
    determining, based on matching the token with tokens in the lookup table, a second confidence score indicating a probability that the token includes PII, the second confidence score being associated with a term in the lookup table that is an exact match of the token;
    storing a model for determining a third confidence score indicating a probability that the token includes PII, wherein the model is generated using a machine learning training algorithm;
    determining, based on inputting the token into the model, the third confidence score;
    masking the token based on the first confidence score, the second confidence score and the third confidence score; and
    providing, as data of improved privacy, the content including the masked token to a content consuming device.

12. The system of claim 11, wherein:
  the content includes transaction data, the transaction data including one or more transaction records each corresponding to a respective transaction and each including a description of the transaction, and
  the token is a part of the description and includes at least one of a number or a word.

13. The system of claim 11, wherein the one or more regular expressions are derived from historical transaction data, the first confidence score is derived from a ratio between a number of terms in the historical transaction data that match the regular expression and that are PII and a total number of terms in the historical transaction data that match the regular expression.

14. The system of claim 11, wherein the lookup table is derived from historical transaction data, the second confidence score is derived from a ratio between a number of appearances of the token in the historical transaction data as PII and a total number of appearances of the token in the historical transaction data.

15. The system of claim 11, wherein the model is based on a conditional random field (CRF) algorithm.

16. The system of claim 15, comprising providing training data for the CRF algorithm, the training data including first data marked as PII and second data marked as non-PII, wherein the first data is labeled as noun forms for the CRF algorithm, the second data is labeled as non-noun forms.

17. A non-transitory computer-readable medium storing instructions that, when executed by one or more processors, cause the one or more processors to perform operations comprising:
  receiving content including a token;
  storing one or more regular expressions for the content, wherein each regular expression comprises a sequence of symbols and characters expressing a string or pattern;
  determining, based on matching the one or more regular expressions with the token, a first confidence score indicating a probability that the token includes personally identifiable information (PII), the first confidence score being associated with the regular expression;
  storing a lookup table that includes one or more tokens for known PII;
  determining, based on matching the token with tokens in the lookup table, a second confidence score indicating a probability that the token includes PII, the second confidence score being associated with a term in the lookup table that is an exact match of the token;

storing a model for determining a third confidence score indicating a probability that the token includes PII, wherein the model is generated using a machine learning training algorithm;

determining, based on inputting the token into the model, a third confidence score;

masking the token based on the first confidence score, the second confidence score and the third confidence score; and providing, as data of improved privacy, the content including the masked token to a content consuming device.

18. The non-transitory computer-readable medium of claim 17, wherein the lookup table is derived from historical transaction data, the second confidence score is derived from a ratio between a number of appearances of the token in the historical transaction data as PII and a total number of appearances of the token in the historical transaction data.

19. The non-transitory computer-readable medium of claim 17, wherein masking the token based on the first confidence score, the second confidence score and the third confidence score comprises:

determining that at least one of the first confidence score, the second confidence score or the third confidence score satisfies a respective confidence threshold; and in response to the determining, masking the token.

20. The non-transitory computer-readable medium of claim 17, wherein masking the token based on the first confidence score, the second confidence score and the third confidence score comprises:

determining that none of the first confidence score, the second confidence score or the third confidence score satisfies a respective confidence threshold;

determining whether a weighted combination of the first confidence score, the second confidence score and the third confidence score satisfies a combined confidence threshold; and masking the token upon determining that the weighted combination satisfies the combined confidence threshold.

* * * * *